May 14, 1929.　　　　E. J. TUCKER　　　　1,712,593
CANOPY FOR TRACTORS
Filed June 3, 1927
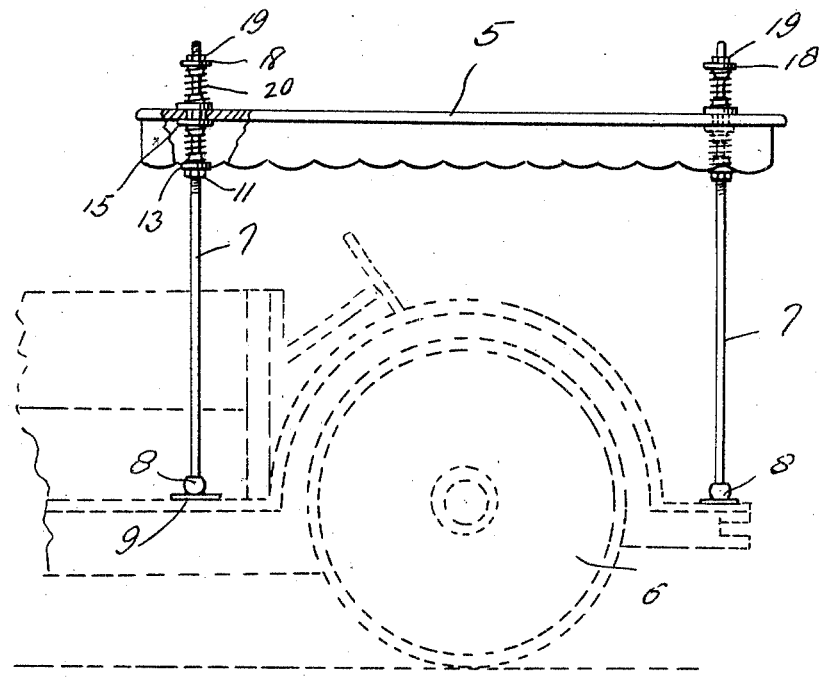
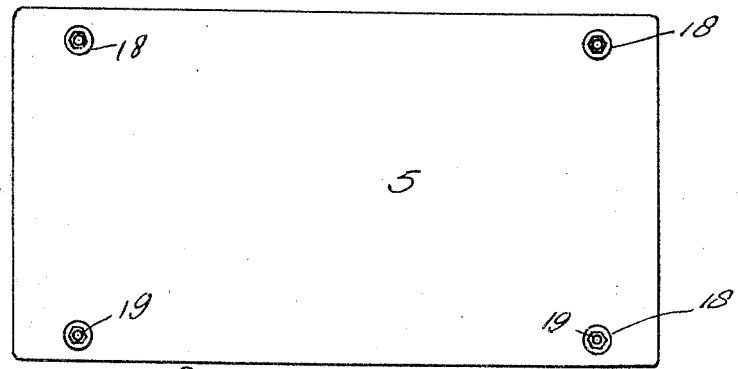
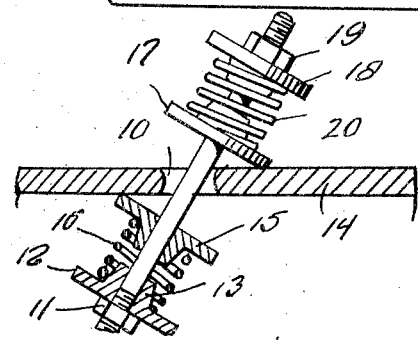
Inventor
E. J. Tucker,
By Clarence A. O'Brien
Attorney Patented May 14, 1929.

1,712,593

UNITED STATES PATENT OFFICE.

ELA J. TUCKER, OF BRAWLEY, CALIFORNIA.

CANOPY FOR TRACTORS.

Application filed June 3, 1927. Serial No. 196,272.

My invention relates to canopies for tractors or the like and has for its principal object to provide a support for the canopy having means arranged thereon for yieldably connecting the same to the canopy whereby to permit limited movement thereof as may become necessary by the vibration or tilting of the tractor as the same travels over uneven ground and adapted to return the canopy to a horizontal position.

A further object is to provide a device of this character which may be easily and quickly attached upon a tractor frame, which is strong and durable and inexpensive to manufacture and install.

Other objects and advantages reside in the special construction, combination and arrangement of parts forming the invention as more fully hereinafter described and claimed, reference being had to the accompanying drawings forming part hereof, wherein:

Figure 1 is a side elevational view showing my canopy in attached position upon a tractor frame, Figure 2 is a top plan view, Figure 3 is a detail of the yieldable connecting means between the canopy and the supporting rods therefor.

Referring now to the drawing I have shown my invention comprising a canopy indicated at 5 arranged in horizontal position above a tractor 6 or the like and supported at each end by a pair of vertically extending rods 7. The lower end of each rod is formed into a ball adapted to be swivelly carried in a socket 8 formed upon a plate 9 by means of which the rods are attached to a portion of the tractor frame.

The upper ends of the rods are inserted through openings in the canopy frame, said openings indicated at 10 in Figure 3 being of sufficient area to permit the free movement of the rods therein. A portion of the rod beneath the canopy frame is provided with a threaded section upon which is arranged a nut 11 adapted to support a washer 12 having a cone-shaped portion 13 extending upwardly. Above the washer 12 and abutting the underside of the canopy frame 14 is arranged a similar washer 15 mounted on the rods and having a cone-shaped portion oppositely arranged with respect to the portion 13 of the lower washer. Between said washers is arranged a coil spring 16 adapted to retain the same in spaced relation with each other.

A similar washer 17 is arranged upon the rod above the canopy frame 14 of a construction similar to the washer 12 and arranged in a similar manner. Likewise, above the washer 17 is arranged a washer 18 corresponding in construction and arrangement with the washer 15 said washer 18 being retained on the rod by a nut 20. Between the washers 17 and 18 is interposed a coil spring 20 adapted to retain the same in spaced relation.

It is obvious that the nuts 11 and 19 carried on the rod will serve to secure the canopy thereon in a substantially firm manner, but by reason of the yieldable nature of the springs arranged above and beneath the canopy frame a limited amount of movement will be permitted therebetween. In the operation of tractors over broken ground the same is subjected to considerable jolting which would quickly result in the breaking or loosening of the parts connecting the canopy thereto if the same were rigidly attached. By providing a yieldable attaching means between the canopy and the supports therefor the same is relieved from the strain of such jolting action. Likewise the ball and socket connection at the base of the rods supporting the canopy permit the same to sway from side to side thus to relieve the same from the strain which is present in a rigid attachment for these parts.

It is obvious that the invention is susceptible to various changes and modifications without departing from the spirit thereof or the scope of the appended claims and I accordingly claim all such forms of the device to which I am entitled.

I claim:

1. A canopy support for tractors comprising a plurality of canopy supporting rods, means at the lower end thereof for pivotally attaching the same to the tractor, means at the upper end thereof for supporting a canopy frame for universal movement, and yieldable means for said supporting means axially disposed thereon.

2. In a canopy for tractors or the like, a plurality of canopy supporting rods, means arranged at the lower ends of said rods for pivotally attaching the same to a tractor frame, a canopy frame arranged at the upper end of said rods, and means axially disposed on said rods above and below said frame, yieldably supporting the frame for universal movement on said rods.

3. In a canopy for tractors and the like, a plurality of canopy supporting rods pivotally connected at their lower ends to the tractor frame, a canopy frame arranged at the upper ends of said rods, and springs axially arranged on said rods and engaging the upper and lower sides of the frame whereby to yieldably support the frame on said rod for universal movement.

4. A canopy for tractors and the like comprising a plurality of rods pivotally mounted on the tractor frame at their lower ends, a canopy frame arranged at the upper ends of said rods, a pair of washers arranged on each of said rods above and below said canopy frame, with the washers disposed adjacent the frame and slidably mounted on the rod and the other washers fixedly secured thereto, and a spring interposed between each pair of washers yieldably supporting the frame on said rods for universal movement.

5. In a canopy for tractors or the like, a plurality of canopy supporting rods pivotally attached to the tractor frame at their lower ends, a canopy frame having relatively enlarged openings adapted to receive the upper ends of said rods, a pair of washers arranged on each of said rods at each side of said frame, a coiled spring arranged on the rod between the washers of each pair, and a cone-shaped member formed on each of said washers and oppositely extending with respect to the adjacent washer whereby to retain the ends of the said springs against transverse movement, and yieldably supporting the frame on said rods for universal movement.

In testimony whereof I affix my signature.

ELA J. TUCKER.